Jan. 14, 1964  R. S. HINSEY  3,117,466
MECHANISM CONTROL
Original Filed June 11, 1956  4 Sheets-Sheet 3

INVENTOR:
ROBERT S. HINSEY.
BY
Harry O. Ernsberger
ATTORNEY

Jan. 14, 1964     R. S. HINSEY     3,117,466
MECHANISM CONTROL Original Filed June 11, 1956     4 Sheets-Sheet 4

INVENTOR:
ROBERT S. HINSEY
BY
Harry O. Ernsberger
ATTORNEY

United States Patent Office 3,117,466
Patented Jan. 14, 1964

3,117,466
MECHANISM CONTROL
Robert S. Hinsey, Toledo, Ohio, assignor, by mesne assignments, to Universal American Corporation, Wilmington, Del., a corporation of Delaware
Original application June 11, 1956, Ser. No. 590,506, now Patent No. 2,963,920, dated Dec. 13, 1960. Divided and this application Dec. 30, 1959, Ser. No. 862,996
7 Claims. (Cl. 74—531)

This invention relates to mechanism control devices and more especially to means or mechanism for actuating or controlling the parking or emergency brake mechanism of a vehicle. This application is a division of my copending application Serial No. 590,506, filed June 11, 1956, now Patent No. 2,963,920.

The invention embraces the provision of a foot operated lever or pedal construction embodying a lever retaining means or detent of a character normally effective for retaining the lever or pedal construction in any position of adjustment and which may be readily released when desired.

An object of the invention resides in the provision of a foot operated lever or pedal arrangement especially adapted for use as a parking brake actuator for the vehicle and embodying means for normally retaining the lever or pedal construction in an adjusted or brake-setting position in combination with manually operable means for rendering the lever or pedal retaining means ineffective when it is desired to utilize the lever or pedal construction as a service brake.

Another object of the invention is the provision of a foot operated lever arrangement for actuating vehicle brakes embodying lever retaining means in combination with cam means for controlling or releasing the lever retaining means.

Another object of the invention is the provision of a foot operated brake actuating lever or means incorporating a detent or lever retaining means in conjunction with a manually operable means movable to a position rendering the detent lever retaining means ineffective to hold the lever in an adjusted position, the arrangement including resilient means associated with the manually operated control means for resiliently biasing the detent or lever retaining means toward effective or pedal retaining position.

Another object of the invention resides in the provision of a control member equipped with a manipulating knob or button manually movable to two positions for rendering a brake actuator retaining means effective or ineffective as may be desired.

Another object of the invention is the provision of a manual control for a parking brake retaining means or lever retaining means which may be inexpensively manufactured and which may be mounted on the instrument panel of the vehicle or which may be supported independently of the instrument panel.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention which may be preferred, in which:

While I have shown the control mechanism of my invention as embodied in a vehicle for actuating or controlling the emergency or parking brakes, it is to be understood that I contemplate the utilization of my invention with any apparatus where it may be found to be adaptable.

Figures 1, 3:
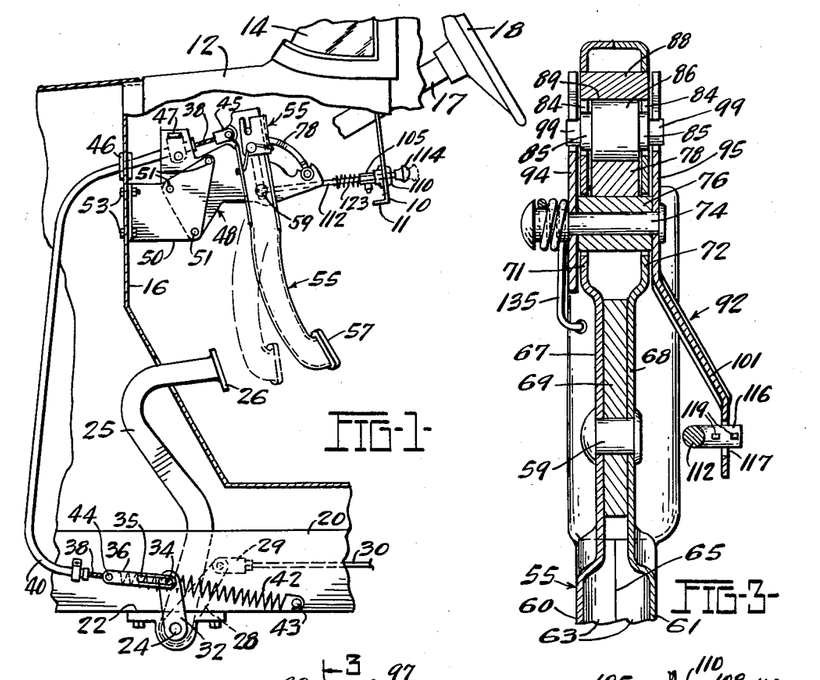
FIGURE 1 is an elevational view partly in section showing a portion of an operator's compartment of a vehicle illustrating one form of the invention installed in the vehicle.
FIGURE 3 is a sectional view taken substantially on the line 3—3 of FIGURE 2.

Referring to the drawings in detail and initially to FIGURE 1, there is illustrated a portion of an automotive vehicle adjacent the operator's compartment. The portion of the vehicle illustrated includes an instrument panel 10, a cowl portion 12 of the vehicle, a windshield 14 and a dashboard or fire wall 16.

The vehicle construction includes a steering post 17 and a steering wheel 18 mounted upon the upper end of the post. A portion of the frame of the vehicle construction is illustrated as at 20, and secured to the frame portion 20 is a bracket 22 upon which is journalled a transversely extending shaft 24.

Fixedly secured to the shaft 24 is a service brake pedal 25 having a foot pad portion 26. Fixedly secured on the shaft 24 is an arm 28 to which is pivotally connected a clevis 29. A rod 30 is secured to the clevis 29 and is connected with brake mechanism (not shown) of the vehicle. The service brakes of the vehicles may be set by the operator depressing the pedal 25 which rotates shaft 24 and arm 28 exerting a longitudinal pull in a left-hand direction as viewed in FIGURE 1 upon the rod 30 to set the brakes of the vehicle.

In the embodiment illustrated, the mechanism control of the invention embraces an auxiliary pedal type mechanism particularly adapatable for setting brake mechanism of a vehicle for parking or emergency purposes. In the embodiment illustrated, the mechanism control of the invention is connected with the same vehicle brake mechanism adapted to be actuated by the service pedal 25, but in certain vehicle installations, the emergency or parking brakes may be independently connected directly with the parking brake control mechanism.

In the embodiment shown in FIGURE 1, the shaft 24 also supports an arm 32 which is keyed on the shaft. The distal end of the arm 32 is provided with a pin 34 which extends into an elongated slot 35 formed in a member 36. The member 36 is connected to one end of a flexible cable 38 which is encased within a sheath 40 and is slidably disposed therein. A contractile coil spring 42 is connected at one end with a pin 43 carried by the frame 20 of the vehicle, the other end of the spring being connected to a pin or member 44 secured to the member 36.

The contractile spring 42 normally urges or biases the member 36 toward brake releasing position i.e. in a right hand direction as viewed in FIGURE 1. Depression of the pedal lever 25 to set the service brakes of the vehicle causes relative movement of the pin 34 in the slot 35 without affecting the position of member 36.

The emergency or parking brake mechanism control of the invention is inclusive of a support or bracket 48 arranged or adapted to be fixedly secured to and carried by a support or member 50 by means of securing screws 51. The member 50 may be fixedly secured to a suitable portion of the vehicle as, for example, the dashboard or fire wall 16 by means of bolts 53.

The upper end zone of the cable 38 is provided with a clevis 45 which is connected by means of a pin 46 extending through openings formed in wall portions of the lever member or construction 55. The sheath 40, enclosing the major portion of the cable 38, extends through a rubber grommet 46 contained in an opening in the dashboard or fire wall 16. The upper end zone of the sheath 40 is secured to the lever support 48 by means of a suitable clamp 47.

The lever member or arrangement 55 for actuating the parking or emergency brakes of the vehicle is of the pedal operated type having a foot pad portion 57. The lever construction 55 is of the first order of levers and is fulcrumed or pivotally supported intermediate its ends upon the bracket 48 by a stub shaft or rivet 59. The lever construction 55, in the embodiment illustrated, is preferably formed of sheet metal comprising substantially matched sections or stampings 60 and 61.

The portions of the stampings or matched sections below the fulcrum or pivot pin 59 are formed with inwardly extending flanges 63 which, when assembled, are in abutting relation as indicated at 65 in FIGURE 3. The abutting flange portions of the lever body sections may be welded together to form an integral construction, and the foot pad portion 57 welded or otherwise fixedly secured to the lower extremities of the sections 60 and 61.

The upper region of the lever body is formed with parallel side walls 67 and 68 which straddle a uniplanar portion 69 of the support 48. The upper wall portions 71 and 72 of the lever sections are spaced apart a greater distance than the portions 67 and 68 as shown in FIGURE 3. Extending through openings in the wall portions 71 and 72 is a stub shaft or rivet 74 upon which is journalled a cylindrical sleeve or bushing 76, the end zones of which extend into the openings formed in the portions 71 and 72.

The sleeve or bushing 76 forms an abutment for direct engagement with the lower curved surface of an arcuately shaped bar or member 78 forming an element of the lever retaining construction. One end of the bar 78 is formed with an enlarged circular head portion 79, as shown in FIGURE 2, which is snugly received in a suitable opening formed in the planar portion 69 of the support 48.

Figures 2, 4:
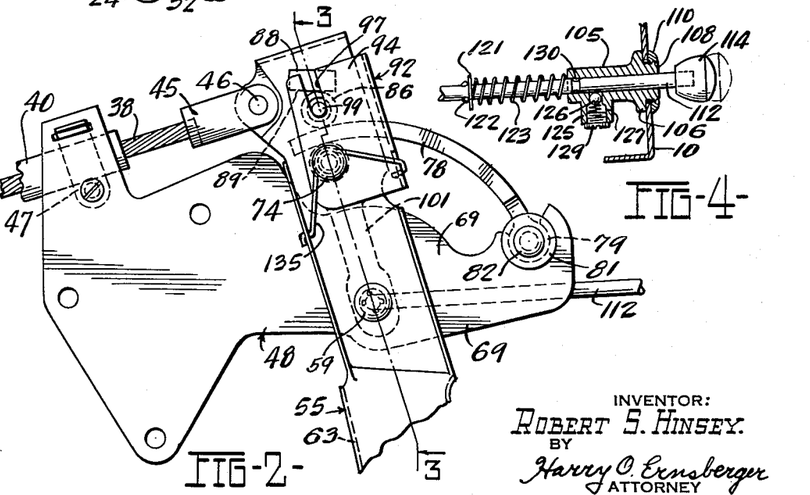
FIGURE 2 is an enlarged elevational view of the upper portion of the lever or pedal arrangement shown in FIGURE 1.
FIGURE 4 is a detailed sectional view illustrating a form of manual control means of the invention.

As shown in FIGURE 2, the opening receiving the circular head portion 79 of the bar is greater than a semicircle providing a restricted throat through which the curved portion of the bar 78 extends, facilitating limited pivotal movement of the bar 78 about the axis of the head portion 79 but preventing disassembly thereof from the planar portion 69. Washers or discs 81 are disposed at each side of the planar portion 69 and are joined by means of a rivet 82 to prevent lateral displacement of the bar 78.

As shown in FIGURE 3, the wall portions 71 and 72 are provided with suitable openings 84 to accommodate shoulder portions 85 formed on a lever retaining means, detent or roller 86. The periphery of the roller 86 is arranged for direct engagement or contact with the upper curved surface of the bar 78, the upper surface forming a region or area cooperating with the roller 86.

The upper regions of the openings 84 are fashioned with generally rectangular zones within which is snugly fitted a rectangularly-shaped hardened abutment block or member 88, the lower surface 89 of which forms a surface also in direct engagement with the periphery of the roller 86. As shown in FIGURE 2, the block 88 is so arranged in the walls 71 and 72 of the lever construction that the surface 89 thereof is angularly arranged with respect to the general curvature of the arcuately shaped bar 78 whereby the roller 86 is disposed between generally converging surfaces.

The detent or roller, in cooperation or wedging relation with the surfaces of the bar 78 and the block 88, serves to retain the lever member or construction 55 in adjusted or brake-setting positions. Means are provided for actuating or controlling the movement of the detent or roller 86 into or out of lever retaining position. The detent or roller controlling mechanism is inclusive of a control lever or arm 92 formed with a U-shaped portion providing parallel wall portions 94 and 95 arranged to straddle the upper portion of the lever construction defined by the walls 71 and 72 in the manner shown in FIGURE 3.

The parallel wall portions 94 and 95 of the detent controlling member are provided with openings accommodating the rivet or stub shaft 74 whereby the control lever or arm 92 is pivotally supported or fulcrumed for movement about the axis of the stub shaft 74. The parallel side walls 94 and 95 are provided with vertically arranged open slots 97 of a dimension to accommodate cylindrical tenons 99 integrally formed on end zones of the roller 86.

The tenons 99 are of a diameter to provide a sliding yet snug fit between the edges of the slots 97 so that substantially no lost motion exists between the peripheries of the tenons and the edge walls of the slots. Thus comparatively small pivotal movement of the manipulating arm 92 about the axis of the stub shaft 74 will be sufficient to move the detent member or roller 86 into and out of locking engagement with the surfaces of the arcuate bar 78 and the block 88. The control member 92 is formed with a depending arm or portion 101 as an integral portion of one of the walls 95.

The arrangement is inclusive of means for controlling the position of the detent actuating or manipulating arm 92. One form of control means of the invention is illustrated in FIGURES 1 through 4. With particular reference to FIGURE 4, there is illustrated a fitting or member 105 formed with a shoulder or ledge 106 and a threaded portion 108. The ledge portion 106 abuts the rear surface of the instrument panel 10 of the vehicle and the threaded portion 108 extends through an opening in the instrument panel and receives a securing nut 110 for retaining the fitting 105 in assembled relation with the instrument panel 10 or other supporting means.

The fitting 105 is bored to slidably accommodate a detent operating rod 112 to one end of which is secured a manipulating knob or button 114. The opposite end zone of the rod is bent at right angles to the major portion of the rod providing a portion 116 which extends through an opening or slot 117 formed in the depending portion 101 of the arm 92.

The opening 117 in the portion 101 of the control arm 92 is preferably slightly elongated in the direction of the length of the portion 101. It should be noted in FIGURE 3, that the portion 116 of the manipulating rod 112 is formed with pairs of swaged projections or ears 119 at diametrically opposed zones, one of the pairs of ears being shown in FIGURE 3. These ear portions are formed by distorting or swaging portions of the rod.

In assembling the rod 112 with the arm 101, the body portion of the rod 112 is aligned with the depending portion 101 so that the projections or ears 119 may enter the elongated regions of the slot 117. The portion 116 of the rod is entered into the slot until the portion 101 of the arm is disposed between the pairs of projections 119 as indicated in FIGURE 3, after which the rod may be swung through an arc of approximately 90°. In this position, the projections or ears 119 prevent disassembly of the portion 116 with the control arm.

In the embodiment illustrated in FIGURES 1 through 4, the detent controlling arm 92 is normally urged or biased toward a position in which the detent or roller is in wedging engagement between the block 88 and the arcuate bar 78 under the influence of resilient means associated with the manipulating rod 112. With particular reference to FIGURE 4, a disc or washer 121 is disposed upon the rod 112 and held in position by means of projections 122 swaged or formed by distorting the metal of the rod 112.

Disposed between the fitting 105 and the disc 121 is an expansive coil spring 123 which normaly biases the rod 112 in a left-hand direction as viewed in FIGURES 1, 2 and 4. Movement of the rod 112 in a left-hand direction exerts pressure upon the arm 92 tending to rotate the same in a clockwise direction as viewed in FIGURE 2 about the axis of the stub shaft 74, thus urging the roller 86 into wedging or lever retaining engagement between the block 88 and the bar 78.

Formed on the fitting 105 is a laterally extending boss portion which is bored to accommodate a ball 126 forming a detent and an expansive coil spring 127. The interior of the bore in the boss 125 is threaded to accommodate a screw or threaded plug 129 which holds the spring 127 in contact with the ball or detent 126 urging the latter toward the rod 112. Formed in the rod is a circumferential recess or groove 130 which is normally in the position shown in FIGURE 4 when the arm 92, under the influence of the spring 123, biases the roller 86 into lever retaining position. A spring 135 engaging the arm 92 and lever 55 may be employed, if desired, to supplement the spring 123.

The operation of the arrangement shown in FIGURES 1 through 4 is as follows: when the operator of the vehicle desires to utilize the lever mechanism or mechanism control member 55 as a parking brake, he merely exerts foot pressure on the pad 57 swinging the lever construction 55 in a clockwise direction about its fulcrum 59. This action exerts a pull upon the cable 38 moving the latter in the sheath 40 and, through the medium of the member 36 and pin 34, swings the arm 32 and shaft 24 in a direction exerting a pull upon the rod 30 to set the vehicle brakes.

When the brakes have thus been set by movement of the lever 55, the roller, under the influence of the expansive spring 123, is urged into wedging engagement between the surface 89 of the block 88 and the upper arcuate surface of the bar 78 so as to frictionally retain the lever construction 55 in brake set position.

When the operator desires to release the parking brake, he grasps the knob 114 and exerts a lengthwise pull upon the rod 112 in a right-hand direction as viewed in FIGURES 1, 2 and 4, which movement causes counterclockwise rotation of the arm 92, moving the roller out of wedging engagement with the block 88 and the bar 78. With the roller in this position, the contractile force of the spring 42 acting through the cable 38 swings the lever construction 55 in a counterclockwise direction about its fulcrum 59 to brake-release position.

In effecting a release of the roller in the manner above described, only a comparatively small longitudinal movement of the rod 112 is required, the movement being less than that necessary to bring the groove or recess 130 into alignment with the ball or detent 126. Should the operator desire to utilize the lever arrangement 55 as a supplement to or in lieu of the service brake pedal 25, the roller may be moved to and held in an ineffective position.

To hold the roller in ineffective position, the operator grasps the knob 114 and moves the rod 112 a sufficient distance in a right-hand direction as viewed in FIGURE 4, until the recess 130 is in alignment with the detent or ball 126. The ball 126, being urged toward the rod under the pressure of the spring 127, enters the recess 130 and thus prevents return movement of the rod 112.

The pressure of the ball in the recess 126 under the influence of the spring 127 is sufficient to overcome the expansive pressure of the spring 123 so that the roller, through the medium of the arm 92, is held in a position out of engagement with the block 88 and bar 78. With the roller moved to ineffective or release position, the lever 55 may be freely moved to brake setting position by pressure upon foot pad 57 and returns to brake release position when foot pressure is removed.

In order to restore the roller or detent means 86 to lever retaining position, the operator merely pushes the knob 114 toward the instrument panel to disengage the ball or detent 126 from the recess 130, thus swinging the arm 192 in a clockwise direction as viewed in FIGURE 2 about its fulcrum to bias the roller 86 into wedging engagement with the block 88 and the curved bar 78.

Figures 5, 6:
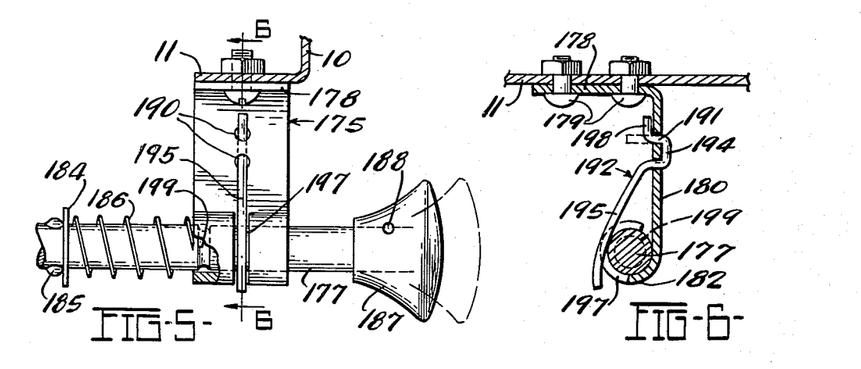
FIGURE 5 is a fragmentary elevational view illustrating another form of manual control means for the detent or pedal retaining means.
FIGURE 6 is a sectional view taken substantially on the line 6—6 of FIGURE 5.

FIGURES 5 and 6 illustrate another form of control means for the lever retaining or detent means, the arrangement including an L-shaped mounting bracket 175 forming a support for the operating rod 177.

One leg 178 of the L-shaped bracket is secured to a flange 11 of the instrument panel 10 by means of bolts 179 extending through openings formed in the leg 178 of the bracket and the flange 11. The depending leg 180 of the bracket 175 is formed at its end zone with a hinge curl configuration 182, the internal diameter being of a size to slidably receive the control rod 177.

A disc or washer 184 disposed on the rod 177 is positioned by means of projections 185 swaged or formed on the rod. An expansive coil spring 186 is disposed between the hinge curl portion 182 and the disc 184 for normally urging or biasing the control rod in a left-hand direction as viewed in FIGURE 5 toward detent-engaging position. The control rod 177 is equipped with a manipulating knob or grip member 187 secured to the rod by a pin 188.

The arrangement shown in FIGURES 5 and 6 is provided with means for holding the rod 177 in detent releasing position. The depending portion 180 of the bracket 175 is formed with a pair of spaced openings 190 arranged or adapted to receive leg portions 191 of a U-shaped zone of a rod retaining member 192, the leg portions being connected by a portion 194.

The member 192 may be formed of spring wire or the like and is inclusive of a portion 195 which extends into a slot 197 formed in the hinge curl configuration 182 of the bracket 175. The portion 195 is tensioned or stressed to frictionally engage the surface of the control rod 177. A leg portion or projection 198, is bent during assembly of the member 192 with the bracket 175 from the broken line position indicated in FIGURE 6 to the full line position whereby the member 192 is securely interlocked or fastened to the bracket 175.

As particularly shown in FIGURE 5, the rod 177 is formed with a circumferential recess or groove 199. The groove 199 is of a dimension to receive the leg portion 195 when the rod is moved to bring the groove into registration with the leg portion 195 by longitudinal movement of the rod 177.

In FIGURE 5, the rod 177 is normally biased under the influence of the spring 186 to a position urging the roller, associated with the control arm 92 with which the rod 177 may be connected, toward lever retaining or locking position. In this position of the control rod 177 and associated elements, the pedal lever arrangement 55 when moved to brake-setting position is held by the detent in such position.

When the operator desires to release the detent in order to release the parking brake, a longitudinal pull in a right-hand direction is exerted upon the rod 177, which movement of the rod swings the control lever 92 in a counterclockwise direction effecting a release of the roller with the block 188 and bar 78, the spring 42 returning the lever arrangement to brake released position.

If it is desired to utilize the lever arrangement 55 as a service brake when combined with the detent control of FIGURE 5, the lever retaining detent may be rendered ineffective by exerting a pull upon the rod 177 in a right-hand direction as viewed in FIGURE 5 until the recess or groove 199 is in registration with the detent or leg 195 of the member 192. The portion 195 enters the groove and under the stress or tension in the portion 195 urging the same toward the rod 177, the latter is thus held in detent release position.

The stress biasing the detent 195 into the groove is of sufficient magnitude to overcome the expansive force of the spring 186 so that the roller is held in ineffective position. In order to restore the roller into locking position, the operator pushes the knob 187 in a left-hand direction as viewed in FIGURE 5 to disengage the detent 195 from the groove 199.

Figure 7:
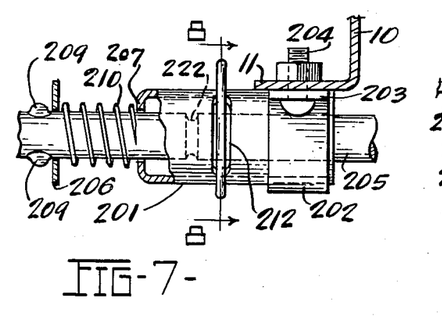
FIGURE 7 is a fragmentary elevational view illustrating another form of detent mechanism control means of the invention.
Figure 8:
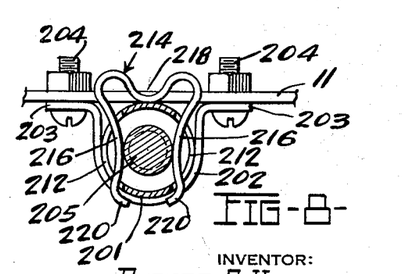
FIGURE 8 is a transverse sectional view taken substantially on the line 8—8 of FIGURE 7.

Another form of control means for the lever retaining means or roller is illustrated in FIGURES 7 and 8. Disposed beneath the flange 11 of the instrument panel 10 is a tube or tubular element 201 preferably formed of sheet metal having a comparatively thin wall.

An end zone of the tubular member or element 201 is telescoped into the bight portion of a U-shaped member or clamp 202. The clamp 202 is formed with laterally projecting ears or tabs 203, the projections 203 and the flange 11 of the instrument panel being formed with registering openings receiving bolts 204 for securing the tubular element 201 in fixed relation and supported by the instrument panel 10.

A control rod 205 extends through the tubular element 201, an end thereof being flanged inwardly as at 207 forming a guide for the rod 205. The rod 205 is provided with a washer or disc 206 which is positioned by means of ears or projections 209 swaged or distorted from the metal of the rod as shown in FIGURE 7. Disposed between the disc 206 and the flange 207 is an expansive coil spring 210.

The expansive spring 210 serves to normally bias the rod 205 in a left-hand direction as viewed in FIGURE 7, and as the rod is adapted to be connected to a control arm or lever 92, the roller associated with the arm 92 is biased toward wedging or lever retaining position.

The walls of the element 201 are formed with diametrically opposed slots or kerfs 212. A rod retaining member 214 of the general configuration of a hairpin is formed with leg portions 216 which extend into the recesses or kerfs 212 formed in the element 201. A central zone 218 at the bight portion of the member 214 is configurated as shown in FIGURE 8 to engage the peripheral surface of the tubular element 201 in order to properly position the member 214 with respect to the tube 201.

The leg portions 216 of member 214 are inherently tensioned or stressed toward each other to frictionally engage the peripheral surface of the rod 205 in the manner illustrated in FIGURE 8. The lower end zones 220 of the leg portions are bent to the configuration shown in FIGURE 8 in order to prevent displacement of the member 214 in an upward direction as viewed in FIGURE 8.

The control rod 205 is formed with a circumferential groove or recess 222. When the control rod 205 is moved by the operator in a right-hand direction by manipulation of a knob or hand grip (not shown), the groove 222 is brought into registration with the leg portions 216 which enter the groove at diametrically opposite zones and serve to hold the control rod in its right-hand position.

The biasing force of the leg portions 216 toward the rod 205 is sufficient to overcome the expansive force of the spring 210 and, through the medium of the control lever or arm 92, the detent is held in ineffective position so that the lever construction 55 may be utilized as a service brake. In order to render the detent of the lever mechanism effective to hold the pedal lever construction 55 in brake setting position, the operator simply moves the control rod 205 in a left-hand direction as viewed in FIGURE 7 to disengage the leg portions 216 from the groove 222.

Figure 9:
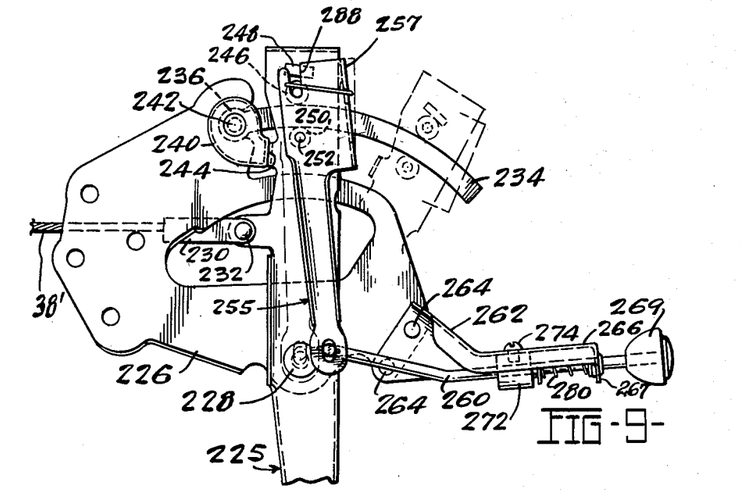
FIGURE 9 is an elevational view of the upper portion of a modification of brake actuating pedal construction showing another form of manually operable means for controlling the detent mechanism of the pedal construction.

FIGURE 9 illustrates a modified form of lever or brake actuator construction and FIGURES 9 through 14 illustrate a modified form of control means for the lever retaining means or detent member. In this form, a lever construction 225 formed of sheet metal sections of the general character of the type shown in FIGURES 2 and 3 is fulcrumed upon a bracket or support 226 by means of a stub shaft or rivet 228. A clevis 230 secured to the lever construction by means of a stub shaft or rivet 232 is connected with a brake operating cable 38'.

An arcuately shaped bar 234 is formed with an enlarged circular head 236 arranged to be received in a recess formed in the support 226 in a manner similar to that illustrated in FIGURE 2. A buffer or abutment is provided in the form of a sheet metal member covered with rubber 240 or cushioning material and is secured in place by means of a stub shaft or rivet 242 which extends through an opening in the enlarged head portion 236 of the arcuate bar 234. The cushion, shock absorber or abutment 240 is adapted to be engaged by a pad portion 244 formed on the lever construction 225 when the latter is in brake release position.

A retaining means or roller 246 of the same construction as the roller 86 shown in FIGURES 2 and 3 is disposed adjacent the upper curved surface of the bar 234 and is arranged to cooperate with the said surface and with the lower surface of an abutment or block 248 supported in the upper end zone of the lever construction 225. Also supported on the lever construction is an abutment or roller 250 supported upon a stub shaft or rivet 252 and engaging the lower surface of bar 234.

A detent manipulating member 255 is formed with a U-shaped portion 257, the leg portions of which straddle the upper zone of the lever. A rivet or stub shaft 252 extends through openings in the leg portions of member 255 and the lever sections providing a fulcrum or pivotal support for the detent control member 255.

In the arrangement shown in FIGURE 9, the manipulating rod 260 fo controlling the operation of the lever retaining means 246 is directly supported upon means carried by the bracket 226. A supplemental bracket or supporting member 262 is secured to the main support 226 by means of rivets 264. The bracket 262 is formed of sheet metal and is provided with a portion 266 extending in substantial parallelism with the manipulating rod 260 and at its forward zone is formed with a depending portion 267.

The depending portion 267 is formed with an opening to receive a rubber grommet 268, the latter having an opening to slidably receive and guide the manipulating rod 260. The manipulating rod 260 is provided at its outer end with a manipulating knob or grip member 269.

Figure 12:
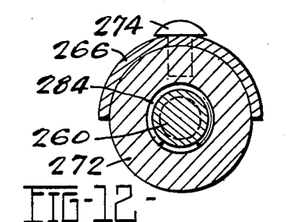
FIGURE 12 is a transverse sectional view taken substantially on the line 12—12 of FIGURE 11.
Figure 13:
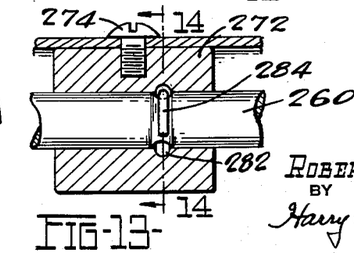
FIGURE 13 is a view similar to FIGURE 11 showing the manual control means in detent releasing position.
Figure 14:
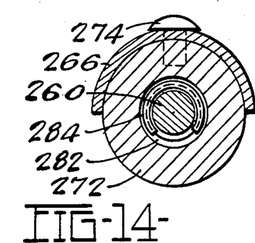
FIGURE 14 is a transverse sectional view taken substantially on the line 14—14 of FIGURE 13.

The portion 266 of the supplemental support or bracket 262 is of semi-annular configuration as shown in FIGURES 12 and 14. Nested in the trough-like configuration formed by the semi-annular portion 266 is a cylindrical fitting or guide member 272 which is secured to the portion 266 by means of a screw 274.

Figure 10:
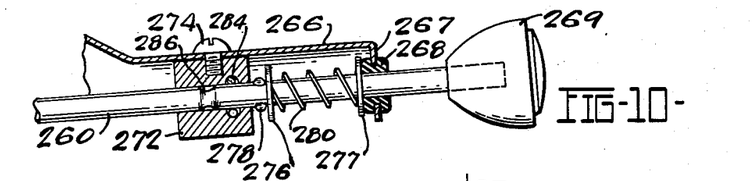
FIGURE 10 is a longitudinal sectional view illustrating details of the manual control means shown in FIGURE 9.
Figure 11:
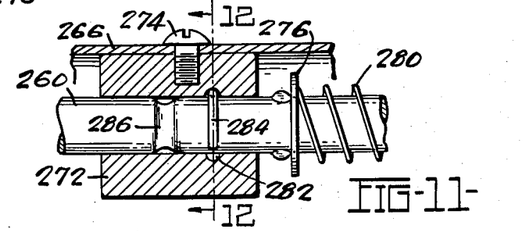
FIGURE 11 is an enlarged fragmentary view of a portion of the mechanism shown in FIGURE 10.

Disposed upon the manipulating rod 260 are spaced washers or discs 276 and 277, the disc 276 being positioned upon the rod 260 by means of ear portions 278 formed by swaging diametrically opposite zones of the rod 260 as illustrated in FIGURES 10 and 11. Disposed between the discs or washers 276 and 277 is an expansive coil spring 280 which normally urges or biases the manipulating rod 260 in a left-hand direction as viewed in FIGURES 9, 10 and 11 urging the control member 255 in a clockwise direction about its fulcrum as viewed in FIGURE 9 to bring the detent retaining means 246 into locking engagement with the bar 234 and the block 248 to hold the lever construction 225 in brake-setting or adjusted position.

The fitting 272 is formed with a bore to slidably accommodate the manipulating rod 260. The fitting 272 is formed with an internal annular groove or recess 282 in which is disposed a partial ring-shaped member 284 which may be formed of spring wire or the like. The manipulating rod 260 is formed with an annular recess or groove 286. When the rod 260 is moved in a high-hand direction as viewed in FIGURES 9 through 11, to a position in registration with the recess 282, the ring-shaped member 284, which is tensioned or stressed to contract around the rod 260, moves into or extends partially into the recess 286 in the manner shown in FIGURES 13 and 14.

In this position the manipulating rod moves the detent controlling arm 255 in a counter-clockwise direction as viewed in FIGURE 9 about its fulcrum 252 to move the lever retaining means or detent 246 out of frictional or wedging engagement between the upper surface of the arcuate bar 234 and the block 248 so that the lever member or construction 225 is free to be moved to any position as the locking mechanism is rendered ineffective.

When the operator desires to restore the detent means 246 to operative or lever locking position, the grip member 269 is pushed inwardly i.e. in a left-hand direction as viewed in FIGURES 9 and 10, which movement carries the manipulating rod 260 to a position wherein the connection of the rod 260 with the arm 255 is virtually at the axis of the fulcrum 228 of the lever construction with the roller 246 in frictional engagement with the bar 234 and the block 248.

The expansive force of the spring 280 acting through the rod 260 urges the control member 255 to a position bringing the roller 246 into effective lever retaining position. The spring 268 may be supplemented by an auxiliary spring (not shown) such as the spring 74 shown in FIGURE 2 to bias the controlling arm 255 toward a position engaging the roller 246 with the surfaces of the bar 234 and the block 248.

The leg portions of member 255 are formed with slots 288 as shown in FIGURE 9 to accommodate tenon portions on the roller 246 in the manner illustrated in FIGURE 2 whereby pivotal movement of the control arm 255 controls the position of the roller 246 with respect to the lever 225. The tenons on the roller 246 extend into enlarged openings (not shown) in the lever construction to accommodate movement of the roller 246 with respect to the block 248 and the bar 234. In this arrangement of the invention, the manipulating means is carried by the lever support 226 independent of the instrument panel.

Figures 15, 16:
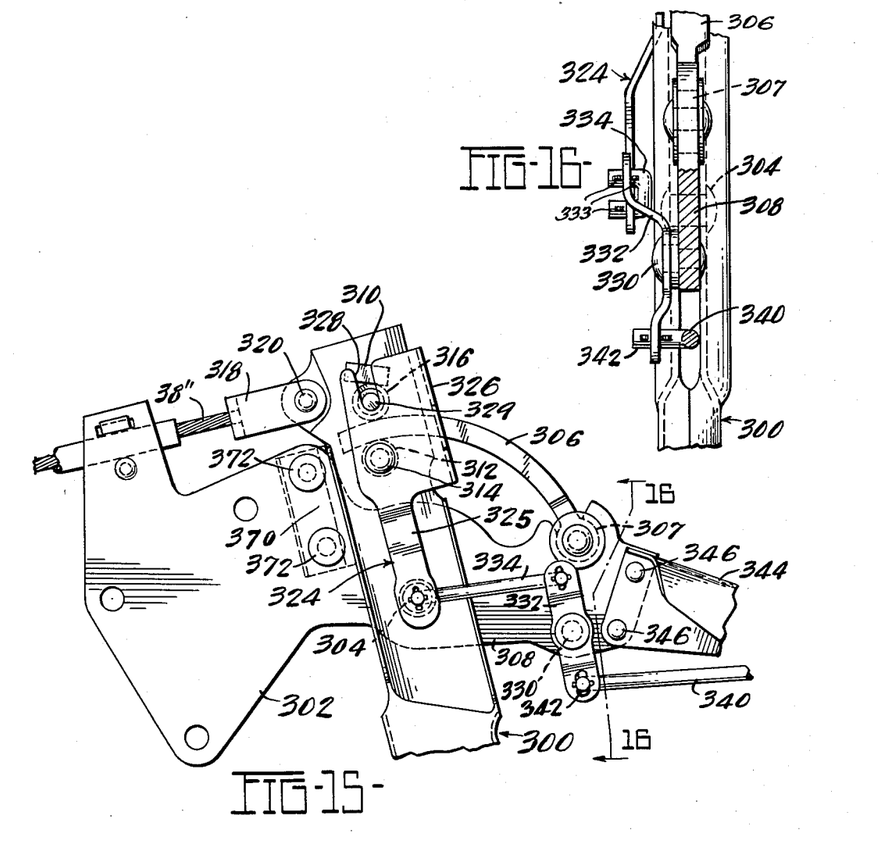
FIGURE 15 is an elevational view of the upper portion of a pedal or lever construction showing another form of manual control means for the retaining mechanism of the lever.
FIGURE 16 is a fragmentary view taken substantially on the line 16—16 of FIGURE 15.
Figure 17:
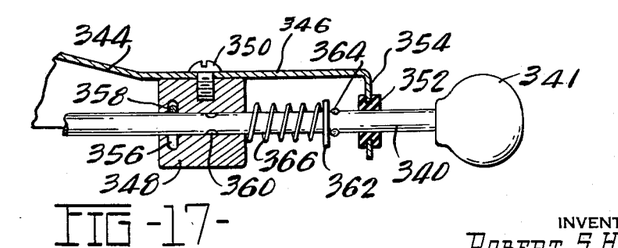
FIGURE 17 is a detailed view partly in section of the manual control means embodied in the arrangement shown in FIGURE 15.

FIGURES 15 through 17 illustrate a lever and detent construction wherein a detent manipulating rod is adapted to be pushed inwardly toward the lever construction in order to hold the detent means in ineffective position. The lever member or lever arrangement 300, which is similar to the lever construction 55 shown in FIGURE 2, is pivoted or fulcrumed upon a support or bracket 302 by means of a stub shaft or rivet 304. The bracket 302 is provided with an arcuately shaped arm 306 having an enlarged circular head portion 307 enclosed within a suitable circularly shaped recess formed in a uniplanar portion of the support 302.

The lever construction is formed with a rectangular block 310 and an abutment or roller 312 carried upon a rivet or stub shaft 314. A roller 316, disposed in suitable clearance openings in the side walls of the lever construction 300, is adapted for wedging or frictional engagement between the upper arcuate surface of the bar 306 and the lower surface of the block 310 for holding the lever 300 in adjusted or brake-setting positions. The cable 38" connected to the brake mechanism is secured to a clevis 318 which is pivotally connected to the lever construction 300 by means of a shaft or rivet 320.

Pivotally supported upon the rivet or stub shaft 314 is a supplemental lever or control arm 324 which is similar in construction to the control arm 255 shown in FIGURE 9. The control arm 324 is formed with a U-shaped portion 326, the leg portions of which are provided with slots 328 to accommodate tenons 329 formed on a lever retaining means 316. As will be obvious from FIGURE 15, a clockwise movement of the arm 324 moves the roller or lever retaining means 316 into frictional or wedging engagement between the arcuate bar 306 and the lower surface of the block 310, which action holds the lever construction 300 in any position of adjustment.

Pivotally or articulately supported intermediate its ends upon the portion 308 of the support 302 by means of a rivet or stub shaft 330 is an arm or lever 332. One end of the arm 332 is connected by means of a link or rod 334 with the depending portion 325 of the control arm 324 adjacent the fulcrum of the lever 300. The end zones of the rod 334 are bent at right angles to the major or body portion of the rod and extend into openings formed in the arm 332 and the depending portion 325 of member 324. The rod 334 is held in cooperative relation with the arms 324 and 332 by means of projections 333 formed on the rod in the manner of the projections 119 shown in FIGURE 3.

A manipulating rod 340 is connected to the opposite end zone of the arm 332 by means of a portion 342 bent at right angles to the major or body portion of the rod 340. One form of rod guiding means and the arrangement for holding the rod in detent releasing position is illustrated in FIGURE 17. The arrangement shown in FIGURE 17 is similar to that shown in FIGURE 10, except that the rod 340 is biased in a right-hand direction by spring means.

Secured to the portion 308 of the support 302 is a sheet metal bracket or member 344 held to the support by means of rivets 346. The bracket 344 is formed with a portion 346 extending in substantial parallelism with the rod 340 and is of a cross-sectional configuration similar to that shown at 266 in FIGURE 14. Nested in the trough-shaped configuration of member or portion 346 is a fitting 348 secured to the portion 346 by means of a screw 350.

The fitting 348 is formed with a bore to slidably receive and guide the manipulating member 340, the latter being provided with a grip portion 341 for manipulating the rod. A rubber grommet 352 is contained in an opening formed in a depending portion 354 of the bracket 344 and serves as guiding means for the rod 340. The fitting 348 is formed with an interior circular recess 356 in which is disposed a spring clip or member 358 of construction similar to the clip 284 shown in FIGURE 14.

The rod 340 is also formed with a peripheral recess 360, which, upon inward or left-hand movement of the rod 340 as viewed in FIGURE 17, will be moved into registration with the spring clip or retaining member 358 to hold the rod 340 in such position. This movement swings the arm 324, carried by the lever 300, about its pivot 314 in a counter-clockwise direction to move the lever retaining means or detent 316 to an ineffective position in which the lever 300 may be freely moved to any position.

Disposed on the rod 340 is a washer or disc 362 held in position by means of projections 364 swaged or distorted outwardly from the metal of the rod 340. Disposed between the disc 362 and the fitting 348 is an expansive coil spring 366 which normally biases the rod 340 to its extreme right-hand position as viewed in FIGURE 17. In this position, through the intermediary of the arm 332, the control arm 324 is resiliently biased or urged to a position carrying the detent member or lever retaining means 316 into effective position between the arcuate bar 306 and the block 310 whereby the lever construction 300 will be automatically retained in brake-set position.

The arm 324 is normally biased to brake setting position through the expansive force of the spring 366. It is to be understood that, if desired, a supplemental spring may be provided in cooperative relation with the arm 324 and the lever construction 300 in the manner of the spring 74 shown in FIGURE 2, however the spring 366 is adequate to bias the mechanism toward an effective position of the detent 316. A rubber buffer or cushion 370 may be secured to the bracket 302 by means of rivets 372 and is adapted to be engaged by the lever 300 in brake-released position.

It will be obvious from the foregoing that the construction shown in FIGURES 15 through 17 is such that the rod 340 is adapted to be pushed toward the lever arrangement in order to move the detent 316 to an ineffective position, the recess 316 being moved into registration with the spring clip 358, the latter moving partially into the recess to hold the rod 340 in a left-hand position as shown in FIGURE 17. To thereafter render the detent effective, the operator grasps the knob 341 and moves the rod 340 in a right-hand direction to disengage the clip 358 of the recess 360.

The detent control mechanisms shown in FIGURES 5 through 8 may be used in conjunction with an arm 322 and link 334 to reverse the action of the control rods 177 and 205. When used in this manner the grooves 199 and 212 in the control rods are formed at the opposite sides of the rod retaining members 192 and 214, and the biasing springs 186 and 210 disposed so as to normally urge the rods in the opposite directions.

It is apparent that, within the scope of the invention, modifications and different arrangements may be made other than is herein disclosed, and the present disclosure is illustrative merely, the invention comprehending all variations thereof.

I claim:

1. Mechanism control including a support, a foot operated lever articulately mounted on said support, abutment surfaces associated with said support and said lever, detent means associated with the lever and engageable with said surfaces for retaining the lever in various positions of adjustment, a control member movably supported upon said lever and having operative connection with said detent means, means for moving said member independently of the lever including a control rod, means effective to bias the member to move the detent means into engagement with said surfaces, an element provided with a bore forming a guide for said rod, an internal circular groove formed in said element, said rod being formed with a peripheral recess, and a detent formed of spring wire disposed in the groove in said guide element and biased toward said rod and engageable in the recess for retaining the control member in ineffective position.

2. Mechanism control including, in combination, a support, a lever fulcrumed on the support, abutment means carried by the lever, means associated with the support formed with an arcuately shaped surface, a roller associated with the lever, an arm movably supported on said lever engaging said roller for controlling the position of said roller, a control rod for said arm, an element supporting said rod, said element having a bore receiving said rod for slidable movement therein, an internal circular groove formed in the wall defining the bore, a rod retaining ring-shaped member disposed in said circular groove and biased into engagement with the rod, said rod having a peripheral recess formed therein and arranged to receive the rod retaining member when said groove and recess are in registration, and resilient means biasing said rod to a position urging the roller in engagement with said arcuately shaped surface and said abutment means.

3. Mechanism control including, in combination, a support, a lever fulcrumed on the support, abutment means carried by the lever, means associated with the support formed with an arcuately shaped surface, a roller associated with the lever, a member movably supported on said lever engaging said roller for controlling the position of said roller, a control rod for said member, an element supporting said rod, said element having a tubular configuration receiving said rod for slidable movement therein, a slot formed in a wall of the tubular configuration, a rod retaining member disposed in said slot and biased into engagement with the rod, said rod having a recess formed therein and arranged to receive the rod retaining member when said groove and recess are in registration, and resilient means biasing said rod to a position urging the roller in engagement with said arcuately shaped surface and said abutment means.

4. Mechanism control including, in combination, a support, a lever fulcrumed on the support, means disposed adjacent the lever adapted to retain the lever in various positions of adjustment, an arm movably supported on said lever and having operative connection with said lever retaining means, a control rod for said arm, means supporting said rod, said rod supporting means formed with a bore receiving said rod for slidable movement therein, an internal circular groove formed in the wall defining the bore and surrounding the rod, a rod retaining member disposed in said circular groove and biased into engagement with the rod, said rod having a peripheral recess formed therein and arranged to receive the rod retaining member when said groove and recess are in registration, and resilient means biasing said arm to a position urging the lever retaining means toward lever retaining position.

5. Mechanism control including, in combination, a support, a foot operated lever mounted for articulate movement relative to the support, means disposed adjacent the lever adapted to retain the lever in various positions of adjustment, means for releasing the lever retaining means including a control rod, a bracket, said bracket being formed with a hinge curl configuration adapted to receive and support the rod for slidable movement therein, means biasing the retaining means to lever retaining position, said rod being formed with a recess, a detent formed of wire interlocked with the bracket and adapted to engage in the recess and hold the lever retaining means in lever releasing position.

6. Mechanism control including, in combination, a support, a lever fulcrumed on the support, means disposed adjacent the lever adapted to retain the lever in various positions of adjustment, a member movably supported on said lever and having operative connection with said lever retaining means, a control rod for said member, an element supporting said rod for slidable movement relative to said element, said element having a tubular portion formed with slots in the wall thereof, a generally U-shaped detent formed of wire straddling said rod and disposed in the slots in said tubular element, said rod being formed with a peripheral recess arranged to receive opposed portions of said detent for retaining said rod in a position maintaining the lever retaining means in ineffective position, and resilient means biasing said rod in a direction rendering the lever retaning means effective to hold the lever in various positions of adjustment.

7. Mechanism control including a support, a lever fulcrumed on the support, means formed with an abutment surface carried by the lever, means associated with the support formed with an arcuately shaped surface, a roller associated with the lever, a member movably supported on said lever engaging said roller for controlling the position of said roller, a control rod for said member, an element supporting said rod, said element being of tubular shape having a portion supporting the control rod for slidable movement relative to said element, said tubular element being formed with opposed slots in the wall thereof, a generally U-shaped detent formed of wire straddling said rod and disposed in the slots in said tubular element, said rod being formed with a peripheral recess arranged to receive opposed portions of said detent for retaining said rod in a position maintaining the roller out of engagement with the abutment and arcuately shaped surfaces, and resilient means biasing said rod in one direction normally urging the roller into engagement with the abutment and arcuately shaped surfaces for holding the lever in various positions of adjustment.

References Cited in the file of this patent

UNITED STATES PATENTS

| | | |
|---|---|---|
| 1,813,286 | Gewalt | July 7, 1931 |
| 2,299,508 | Skareen | Oct. 20, 1942 |
| 2,308,898 | Skareen | Jan. 19, 1943 |
| 2,531,130 | Jandus | Nov. 21, 1950 |
| 2,922,316 | Schmid | Jan. 26, 1960 |